INVENTOR
JOHN W. SCHWARTZENBERG

BY

AGENT

PULSE WIDTH MODULATOR

United States Patent Office 3,391,315
Patented July 2, 1968

3,391,315
PROCESS CONTROLLER IN WHICH RATE ACTION IS ADAPTIVELY MODIFIED BY PROCESS LOAD USING A PULSE-WIDTH MODULATOR
John W. Schwartzenberg, Maple Glen, Pa., assignor to Leeds & Northrup Company, a corporation of Pennsylvania
Filed Oct. 20, 1964, Ser. No. 405,038
7 Claims. (Cl. 318—18)

ABSTRACT OF THE DISCLOSURE

A process controller in which the rate action is modified in accordance with a change in the process operating level or load. The modification of the rate action is accomplished by means of a relay which connects a rate resistor to allow charging of the rate capacitor for a fixed portion of successive periods which are varied by a pulse-width modulator in dependence upon the process load.

---

This invention relates to adaptive process controllers and more particularly to a novel means for maintaining the response of such a controller at an optimum level as the characteristics of the process under control vary.

The conventional linear controller is useful and effective in the control of the many industrial processes which are linear in character as well as in a number of non-linear processes in which the operating level or load of the process varies over a sufficiently narrow range to allow the treatment of the process as if it were in reality linear in character. Many control applications, however, involve non-linear processes in which the operating level or load of the process varies over a sufficiently extensive range so that the conventional linear process controller cannot provide a suitably stable and effective control. In these later non-linear processes in order to apply a linear controller it is necessary that it be tuned at a load very close to the lowest value of the process load which is encountered in normal operation. With such tuning the control tends to act in a very sluggish manner when working at much higher load levels. This sluggishness results from a loss of loop gain and/or relative reduction in the reset control action when both the gain and the reset adjustment of the controller remain fixed throughout the range of load changes. Tuning at a higher load would on the other hand cause instability to occur at the lower load values without necessarily removing the sluggish nature of the control response at the higher load levels.

It has been found that an effective control of such non-linear processes over the full expected load range may require an adjustment of both the gain due to proportional control action as well as the reset rate as the load changes, the reset rate being the number of times per minute that proportional-position control action is repeated. Generally it is necessary to decrease the reset rate continuously as the process load is increased while the gain adjustment is increased as the load level increases.

For a still more effective adjustment of the controller to accommodate the load changes it is desirable to vary the value of the controller's rate time with load in addition to the adjustment of the reset rate and gain settings as above mentioned. Rate time may be defined as the time interval by which the rate action advances the effect of the proportional-position action. It has been found that rate time generally must be decreased as the load level increases.

More specifically it has been found that the gain of a process controller to be adaptive to a wide range of process conditions may be varied in accordance with a constant value plus a value directly related to the magnitude of the process condition for which the adaptation is required.

The reset rate on the other hand may advantageously be varied in accordance with the reciprocal of the sum of a constant related to the fixed portion of the system dynamics and a variable related to the reciprocal of the process condition adapted for.

The rate time for such a process controller should, on the other hand, be varied directly in accordance with the sum of a constant related to the fixed portion of the process dynamics and a variable related to the reciprocal of the process condition adapted for.

Many of the methods which have been utilized in the past to accomplish an adaptation of controller response to the load level at the process being controlled have inevitably been either complex in nature, expensive of manufacture, or difficult of adjustments, and some have incorporated several of these deficiencies. It is therefore an object of the present invention to provide an improved adaptive process controller.

It is a further object of this invention to provide an improved means for modifying the rate time adjustment of a process controller in accordance with changes in the dynamic characteristics of the process.

A further object of this invention is the provision of improved means for jointly modifying the gain adjustments and the rate time of a controller in accordance with changes in the characteristics of the process.

Still another object of this invention is the provision of means for readily adjusting the gain, reset rate and rate time responses of a process controller in a manner to provide optimum control at all process load levels.

In accordance with this invention there is provided a simple and inexpensive means for modifying the rate responses of a process controller to vary its magnitude with changes in process characteristics. This variation in response can be accomplished by a change in the average response as by periodically changing the rate time between two predetermined levels. The rate response is preferably varied directly in accordance with the sum of a time constant of fixed value and a time constant varying as the reciprocal of the process characteristic, such as load.

In concurrently filed U.S. patent application bearing Ser. No. 405,039, C. W. Ross, a coworker of mine, has claimed those novel aspects of the present disclosure which are not claimed herein.

For a more detailed understanding of the invention reference is made to the drawings in which.

Figure 1:
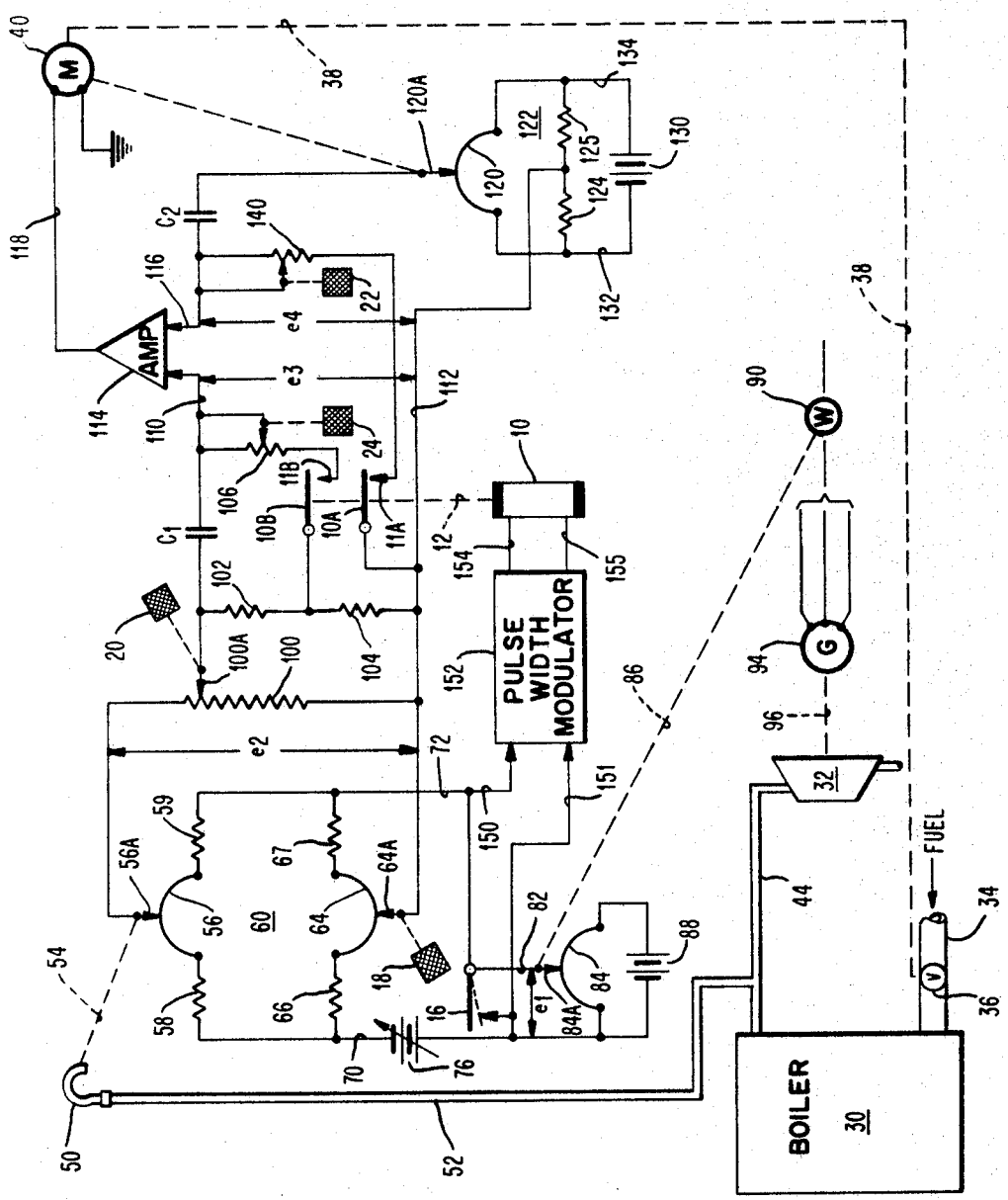
FIG. 1 is a schematic drawing of a modified conventional three-mode controller incorporating the novel means for varying the controller response with load level.

Referring to FIG. 1, it may be seen that the circuit of the controller there illustrated is essentially that of a conventional three-mode controller of a type which is now well known in the art. U.S. Patent 2,830,245, issued to E. T. Davis, shows one form of this type of controller. The present three-mode controller has, however, been altered by the incorporation of a relay 10 which is effective to operate its several movable contacts 10A and 10B. When the relay 10 is energized so that the contacts 10A and 10B are held in contact with the stationary contacts 11A and 11B, respectively, and when the switch 16 is in its closed position the circuitry of the controller is that of a conventional type of three-mode controller which incorporates the usual adjustments for the parameters which determine the controller response. For example, the set point of the controller is effectively established by adjustment of knob 18 while the proportional band, the gain of the controller, is adjusted by knob 20. Similarly, the reset rate of the controller is under the adjustment of knob 22 and the rate time is under the adjustment of the knob 24.

The controller of FIG. 1 is shown as being applied to a non-linear process which includes boiler 30 and its connected turbine 32. The manipulated variable involved in the illustrated control system is the adjustment of the fuel flow in pipe 34 by the modification of the position of the fuel flow valve 36 by the mechanical connection 38 in response to the controller output to the drive unit 40. The modification of the fuel input to the boiler 30 by adjustment of valve 36 serves to modify the rate of production of steam by boiler 30 and to thereby provide a means for correcting the steam pressure in output steam line 44 which carries the superheated steam from boiler 30 to turbine 32.

In FIG. 1 the controlled variable is steam pressure in output line 44. This pressure is detected by Bourdon tube 50 which is shown connected to line 44 by the line 52. Changes in the pressure as detected by Bourdon tube 50 are effective through the mechanical linkage 54 to change the position of the tap 56A on slidewire 56. Slidewire 56 along with its end resistors 58 and 59 are incorporated as one branch of the bridge circuit 60. Another branch of the bridge circuit 60 includes slidewire 64 and its associated contact 64A as well as its end resistors 66 and 67. Both the branch of the bridge circuit 60 which includes slidewire 56 and that which includes slidewire 64 are supplied with power by a power supply connected between lines 70 and 72.

In the conventional controller the power supply for this bridge circuit would normally be a fixed potential such as that supplied by battery 76 which is shown as being adjustable to a desired value. Thus with switch 16 closed the bridge circuit 60 is in a conventional form. When, however, switch 16 is in its illustrated open position the power supply to the bridge 60 is modified by the inclusion of a variable potential $e_1$ which is introduced between lines 80 and 82, by the positioning of slidewire contact 84A of slidewire 84 by mechanical coupling 86. As illustrated the slidewire 84 is in shunt to a power supply 88 which is represented as a battery.

The positioning of the slidewire contact 84A by the mechanical coupling 86 is effected by wattmeter 90 which is connected to measure the power output of generator 94, the generator 94 being connected by shaft 96 to turbine 32. Thus the positioning of the mechanical coupling 86 is an indication of the load on the process and the potential $e_1$ which is the adaptive signal is therefore varied directly in accordance with changes in the load as measured by the wattmeter 90.

It is thus evident that the incorporation of the additional variable potential $e_1$ along with an adjusted fixed potential from battery 76 as a power supply for bridge 60 provides a means for multiplying the deviation of the controlled variable from its set point as the load of the process under control varies. Thus the potential difference between contact 56A which is representative of the magnitude of the controlled variable and potential at contact 64A which is representative of the set point as adjusted by knob 18 is effectively multiplied by a constant represented by battery 76 plus a variable represented by the potential $e_1$.

In the controller of FIG. 1 that potential difference is an input signal in the controller and is represented as potential $e_2$ which is placed across the variably tapped resistor 100 whose associated tap 100A is adjusted by knob 20 in accordance with the desired adjustment of the proportional response or gain of the controller.

The adjustment of the contact 100A determines the current flow through shunting resistors 102 and 104. In addition there is a current path from contact 100A through the capacitor $C_1$ and an adjustable rate resistor 106 which also flows through resistor 104 to line 112 when the movable contact 10B is closed upon fixed contact 11B by actuation of relay 10. This additional current flow through the resistor 104 is related to the rate of change of the potential $e_2$ by virtue of the incorporation of rate capacitor $C_1$ in the circuits. When the relay contact 10B is closed upon fixed contact 11B, as is the case with the conventional circuit arrangement, there then appears between line 110 and line 112 a potential $e_3$. This potential is indicative of the sum of both the porportional component and the rate component of the response of the controller.

Line 110 provides one input to the controller amplifier 114. The other input to amplifier 114 is by way of line 116 and the output to the connected drive unit 40 is by way of line 118. Representing the potential of line 116 with respect to line 112 as $e_4$, amplifier 114 is designed to provide an output signal on line 118 which will cause the motor drive unit 40 to move contact 120A of slidewire 120 until the potential $e_4$ is equal to the potential $e_3$.

Slidewire 120 forms one branch of a second bridge circuit 122. Another branch of bridge circuit 122 is formed by the resistors 124 and 125 which may be of equal value. Line 112 is connected to the point intermediate between the resistors 124 and 125 and the bridge circuit 122 is supplied by fixed potential from battery 130, the battery being connected between the lines 132 and 134 across which both of the branches of the bridge are coupled.

It will be evident that when movable contact 10A is closed upon fixed contact 11A and the potential at the contact 120A is different from the potential on line 112 there will be current flow from contact 120A through the reset capacitor $C_2$ and reset resistor 140, which is adjustable by knob 22, to line 112. Line 116 which forms one of the inputs to amplifier 114 is connected to the point intermediate between the reset capacitor $C_2$ and reset resistor 140. Therefore, in order to maintain a particular potential $e_4$ on line 116 it is necessary that the drive unit 40 continuously move the slidewire contact 120A at a substantially constant rate depending on the potential to be maintained. The potential $e_4$ is thus essentially a time derivative of the potential at contact 120A, therefore the effect in the circuit is to provide a resetting or integral component to the controller response. The controller of FIG. 1 is therefore effective to position the fuel valve 36 in response to not only the magnitude of the deviation of the controlled variable from its set point by virtue of the proportional action but also in accordance with the rate at which the controlled variable changes as well as in accordance with the time integral of the deviation of the controlled variable from its set point. This type of control is commonly referred to as a conventional three-mode control and the circuit of FIG. 1, in so far as it has been described with switch 16 closed and relay 10 energized effects a fixed proportional action as well as a fixed reset rate and a fixed rate time response in accordance with the adjustments of the several knobs 20, 22 and 24.

Process control applications of the type shown in FIG. 1 are non-linear in character and have variable process gains and variable process lags depending upon the load on the process at the time. It has been previously pointed out that it is desirable to modify the several modes of control in accordance with changes in the process load when controlling such a non-linear process. As already described, the opening of switch 16 introduces a variable voltage $e_1$ into the power supply to bridge 60 thus multiplying the proportional response by a factor corresponding to the variable voltage $e_1$ which is itself dependent upon the load as measured by wattmeter 90. A similar result could be accomplished by introducing a multiplier into the output of bridge 60.

The voltage $e_1$ is also utilized in FIG. 1 as an input on lines 150 and 151 to the pulse width modulator 152. The pulse width modulator is preferably designed to produce on its output lines 154 and 155 an energizing current for the connected relay operating coil 10 so that the relay 10 is actuated for a fixed period with the interval between successive actuations being of a duration dependent upon the magnitude of potential $e_1$. Relay 10 is therefore effective to connect the rate resistor 106 and the reset resistor 140 into the control circuit by the closing of contacts 10A and 10B on their respective fixed contacts 11A and 11B for a short fixed period in each of a succession of variable intervals so that the percentage of time those contacts are closed is related to the magnitude of potential $e_1$. When the relay 10 is energized 100% of the time the settings established by the adjustment of knobs 22 and 24 are directly indicative of the reset and rate responses which will result, however when relay 10 is energized only a fraction of the time, the effective reset resistance which is established by resistor 140 is modified as is the effective rate resistance established by resistor 106. Thus if relay 10 is energized 50% of the time the effect on the average as far as the control responses are concerned is the same as would be the case if the resistors 106 and 140 had in fact values twice as great as those adjusted by the settings of knobs 24 and 22, respectively.

It will thus be evident that by periodically energizing relay 10 for a fixed period at intervals variable in duration proportional to the load on the process as measured by the wattmeter 90, both the reset rate and the rate time components of the controller response are effectively modified so that they are both effectively decreased as the load of the process increases.

The effective resistance parameters established by periodically connecting resistors 106 and 140 may be considered as being in accordance with the time average of the actual resistance in the respective circuit branches.

Figure 1A:
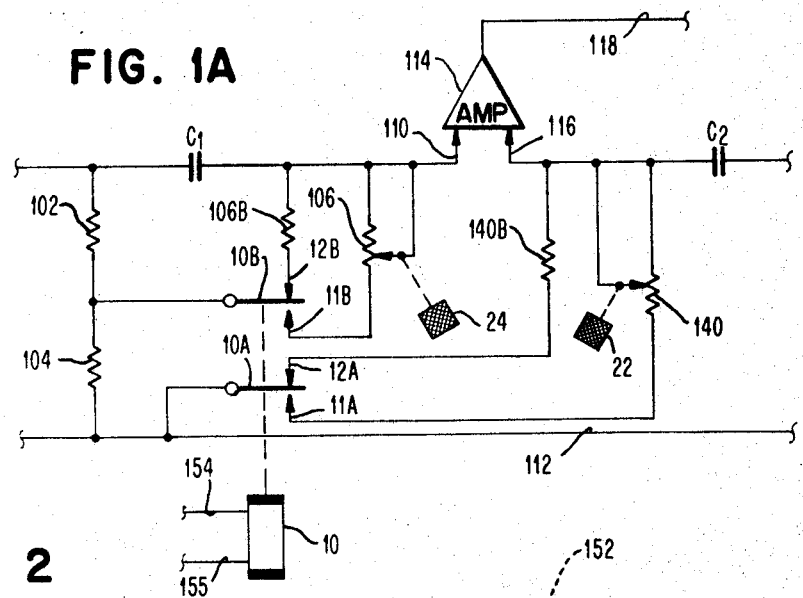
FIG. 1A is a partial circuit diagram of a variation of the rate and reset circuits of FIG. 1.

In FIG. 1A the rate and reset circuits of the controller of FIG. 1 have been modified by the addition of resistors 106B and 140B. Resistor 106B is connected between line 110 and an upper fixed contact 12B which is contacted by the movable contact 10B when relay coil 10 is de-energized. Thus resistor 106B becomes the rate resistor in substitution for resistor 106 so that as relay coil 10 is periodically energized the rate component of the controller response is varied between two levels. In FIG. 1, one of the levels was that established by the infinite resistance of the open circuited relay contact 10B.

Similarly the contact between contacts 10A and 12A completes a circuit between line 116 and 112 by way of resistor 140B which provides one of the two levels between which the reset component of the controller response can be varied by the actions of relay 10.

While generally relay 10 will control the variation of both the reset rate and the rate time it will be obvious to those skilled in the art that separate relays for each function could be used and those relays could be operated from separate pulse width modulators so that the variations of the separate functions could be different.

Figure 2:
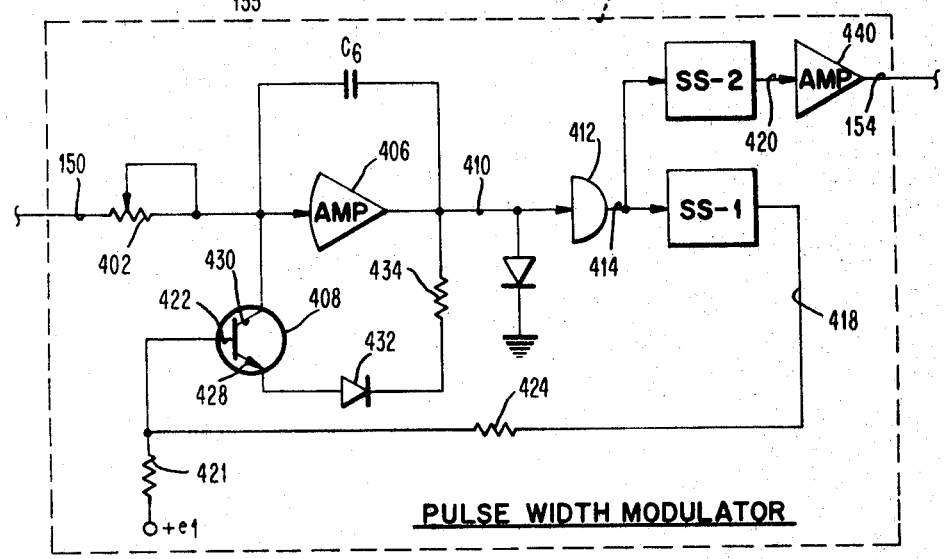
FIG. 2 is a circuit diagram of one of the possible circuits which may be utilized to effect the pulse width modulation required in FIG. 1.

Pulse width modulator 152 is shown in FIG. 1 as a block. It may be constructed as a circuit of the type shown in FIG. 2, for example, although it will be obvious to those skilled in the art that many other modifications of this circuit and different designs are possible for obtaining the desired modulation of the percentage of time that a relay 10 is energized. In FIG. 2 input line 150 connects through a variable input resistor 402 to a high gain amplifier 406 which in conjunction with its shunting capacitor $C_6$ provides an integrating effect. Amplifier 406 is selectively shunted by a switching circuit which utilizes transistor 408 as the switching element. Transistor 408 which is shown as an npn type may be considered as being normally nonconductive in which case the input signal on line 150, which will be assumed to be of a positive value, will produce on the output line 410 of amplifier 406 a negative potential of constantly increasing magnitude.

Figure 3:
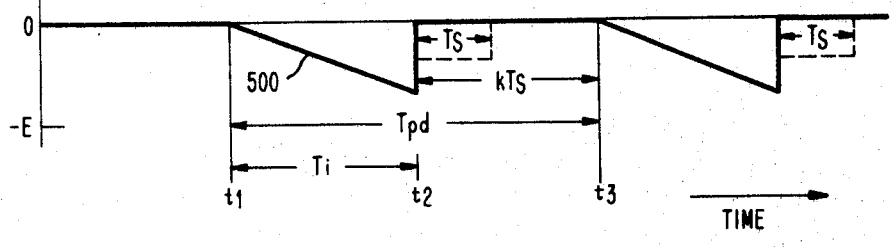
FIG. 3 is a graphic illustration useful in the explanation of the circuit diagram of FIG. 2.

Referring to the wave form shown in FIG. 3 the solid line 500 represents this constantly increasing negative potential between the time $t_1$ and $t_2$. When the potential of output line 410 has reached the value $-E$ after a variable period $T_1$ the gate circuit 412 is effective to produce a positive output on line 414 starting at $t_2$. This signal triggers the two single-shot circuits SS–1 and SS–2 which then respectively produce for their individual predetermined periods $kT_s$ and $T_s$ a changed potential on their respective output lines 418 and 420. Thus, for example, an input pulse on line 414 to the single-shot circuits SS–1 and SS–2 which is a positive going negative voltage which goes from $-10$ volts to ground, for example, can initiate on the output lines 418 and 420 a similar positive going potential from $-10$ volts to ground. That ground potential on the lines 418 and 420 is shown as continuing for the predetermined set time periods depending upon the adjustments of the circuits SS–1 and SS–2. At the end of those periods the potentials on lines 418 and 420 may return to a $-10$ volt potential. Single-shot circuits of the type which may be utilized for the blocks shown as SS–1 and SS–2 in FIG. 2 are shown and described in a U.S. patent application Ser. No. 399,216 by C. W. Ross.

When the signal on line 418 goes from a $-10$ volt potential to ground, transistor 408 is biased to an "on" state by the positive potential which appears at base 422. The conductive transistor 408 then shorts out amplifier 406 and capacitor $C_6$. As shown in FIG. 2 transistor 408 has its base terminal biased by potential $+e_1$ which is connected by way of resistor 421 to base terminal 422. Output line 418 from the circuit SS–1 is connected through resistor 424 to the base connection 422. Whenever the potential on line 418 is at a $-10$ volt potential the base 422 is not sufficiently positive with respect to the emitter 428 to make transistor 408 conductive. However, when the signal on line 418 goes to ground potential the base 422 becomes sufficiently positive with respect to emitter 428 to make transistor 408 conductive so that there is a current flow from the input of amplifier 406, through collector 430, through the emitter 428 and then through diode 432 and its series resistor 434 to line 410.

During the period that the transistor 408 is in an "on" condition, amplifier 406 and capacitor $C_6$ cease to integrate and as shown in FIG. 3 the negative potential on line 410 decreases at time $t_2$.

Likewise at time $t_2$ the single-shot circuit SS–2 is triggered and has produced on its output line 420 a pulse having a duration dependent upon the setting of the circuit SS–2. This pulse is amplified by amplifier 440 to produce an output on line 154 which is of the desired polarity and is sufficient in power to actuate relay 10 of FIG. 1. Thus the circuit of FIG. 2 is effective to cause relay 10 of FIG. 1 to be energized for a fixed period as shown in FIG. 3 by the dash line and labeled $T_s$. This particular period of energization of relay 10 being effected at intervals which are directly dependent upon the magnitude of the input signal on line 150 and the time period during which the pulse output is produced on line 418 from SS–1. This latter time is labeled $kT_s$ in FIG. 3 and takes up the period between time $t_2$ and time $t_3$. Thus the total period T for the circuit of FIG. 2 is that period between the times $t_1$ and $t_3$ which period tends to increase with a decrease in the magnitude of the input on line 150 of FIG. 2 so that as the input on line 150 decreases the duration of the impulse output on line 154 becomes a smaller percentage of the total period.

It will be evident from FIG. 3 that the cyclic operation of the circuit of FIG. 2 is continuous as long as there is a signal on line 150, for capacitor $C_6$ begins integrating the input on line 150 again when transistor 408 is made non-conductive by the disappearance of the pulse signal on line 418.

In order that the pulsing of relay coil 10 in FIG. 1 will cause the least interference with the response of the controller it is desirable that the period T be kept as short as possible. Therefore the parameters of the integrating circuit consisting of amplifier 406 and capacitor $C_6$ as well as the settings of SS–1 and SS–2 should be chosen accordingly.

What is claimed is:

1. In a process controller utilizing a first resistance-capacitance network to establish its reset action and a second resistance-capacitance network to establish its rate action the combination of relay means operable to selectively disconnect said resistance-capacitance network to stop the charging current from flowing in both said first and said second networks when said relay means is in one state, and pulsing means connected to said relay means and operable to place said relay means in said one state for a portion of each of a group of recurring periods, said periods being of duration determined by the sum of a constant value representing the constant portion of the process time constant and a variable value representing a variable value representing a variable portion of the process time constant, the remaining portion of said periods being a portion of fixed duration during which said relay is in a second state which allows said charging current to flow in said first and second networks for producing reset and rate action.

2. In a process controller having separate components for producing in the manipulated variable a proportional, reset and rate response to a deviation of the controlled variable from its set point, the combination of means for varying the magnitude of said reset and rate response between two levels, and means for actuating said last named means to change the level of said response for variable periods at intervals such that the time average of said response as established by said variable periods is adjusted to correct the response of said controller for changes in the characteristics of said process.

3. A process controller comprising a first bridge circuit connected across a potential source and having a variable tap in one branch set in accordance with the set point of the process and a variable tap in another branch set in accordance with a measured value for the controlled variable, a first resistor connected between said taps, an adjustable tap on said first resistor positioned to establish the desired proportional response for said controller, a second and third resistor connected in series between said adjustable tap on said first resistor and one end of said first resistor, a first capacitor connecting on one side to said tap on said first resistor, a variable fourth resistor having one terminal connected to the other terminal of said first capacitor, a relay having one contact for connecting another terminal of said fourth resistor to a point intermediate between said second and third resistors only when said relay is in one state, a second bridge circuit connected across a potential source and having a variable tap positionable along an associated slidewire in one branch of said second bridge and a fixed tap in another branch, a connection between one of said taps of said second bridge circuit and one of said taps of said first bridge circuit, a second capacitor having one terminal connected to said variable tap of said second bridge circuit, a variable fifth resistor having one terminal connected to the other terminal of said second capacitor, a second contact of said relay connecting another terminal of said fifth resistor to the said tap of said second bridge circuit connected to one of said taps of said first bridge circuit when said relay is in said one state, amplifier means connected to said one terminals of said fourth and fifth resistors and operable to produce an output signal whenever the potentials at said one terminals of said fourth and fifth resistors are unequal, a drive unit connected to the output of said amplifier and operable in response to said output to change the magnitude of the manipulated variable of the process, means connecting said drive unit to said variable tap on said slidewire of said second bridge circuit so that movement of said drive unit in response to said amplifier output is in such a direction as to tend to reduce the difference in the potentials at said one terminals of said fourth and fifth resistors, means responsive to a variable of the process which changes with changes in the time constant of the process for actuating said relay into said one state for a fixed periodic of time representing a percentage of the total time related to said last named variable whereby the time average of the rate and reset control effects established by the connection of said fourth and fifth resistors by said relay is modified in accordance with said last named variable to accommodate the control of said manipulated variable to changes in the time constant of the process.

4. A method for providing adaptive control of a process comprising the steps of producing an error signal indicative of the deviation of the controlled variable from its set point, producing an adaptive signal indicative of the variations in the dynamics of said process, altering the manipulated variable in accordance with a proportional action and a rate action, said proportional action being related to the magnitude of said error signal by a factor variable with said adaptive signal, and said rate action being related to the magnitude of said error signal by a factor which includes a term whose value is directly related to the sum of a constant representing the fixed portion of the system dynamics and a variable related to the reciprocal of said adaptive signal.

5. In a process controller utilizing a resistance-capacitance network to establish its rate action the combination of means selectively operable to connect and disconnect said resistance-capacitance network for current flow therethrough, and pulsing means for actuating said last named means so that said resistance-capacitance network is connected for current flow therethrough only during a portion of each of a group of pulses periods said portion being determined in accordance with a constant value representing the constant part of the dynamics of the process and a variable value representing a variable part of the dynamics of the process.

6. A method for providing adaptive control of a process comprising the steps of producing an error signal in response to the deviation of the controlled variable from its set point, producing an adaptive signal in response to a process variable indicative of the variations of the dynamics of said process, and altering the manipulated variable in accordance with a proportional action, a reset action and a rate action, said proportional action being related to the magnitude of said error signal by a factor variable with said adaptive signal, said reset action being related to the magnitude of said error signal by a factor which includes a term whose value is related to the reciprocal of the sum of a constant representing the fixed portion of the system dynamics and a variable related to the reciprocal of said adaptive signal, and said rate action being related to the magnitude of said error signal by a factor which includes a term whose value is directly related to said sum.

7. A method for providing adaptive control of a process comprising the steps of
producing an error signal in response to the deviation of the controlled variable from its set point,
producing an adaptive signal in response to a process variable indicative of variations in the dynamics of said process, and
altering the manipulated variable in accordance with a proportional action and a rate action, said rate action being related to the magnitude of said error signal by a factor which includes a term whose value is directly related to the sum of a constant which represents the fixed portion of the system dynamics and a constant which represents the variable portion of the system dynamics.

References Cited

UNITED STATES PATENTS 3,096,471  7/1963  Taylor.
3,149,270  9/1964  Smyth et al.

ORIS L. RADER, *Primary Examiner.*

THOMAS E. LYNCH, *Examiner.*